(12) United States Patent
Heusser et al.

(10) Patent No.: US 9,618,016 B2
(45) Date of Patent: Apr. 11, 2017

(54) SOLAR GENERATOR AND HYDRAULIC CONTROL SEAT VALVE

(71) Applicant: HAWE HYDRAULIK SE, Munich (DE)

(72) Inventors: Martin Heusser, Munich (DE); Markus Imlauer, Munich (DE); Andreas Nocker, Peiting (DE)

(73) Assignee: HAWE HYDRAULIK SE (DE)

( * ) Notice: Subject to any disclaimer, the term of this patent is extended or adjusted under 35 U.S.C. 154(b) by 634 days.

(21) Appl. No.: 13/920,274

(22) Filed: Jun. 18, 2013

(65) Prior Publication Data
US 2013/0340744 A1      Dec. 26, 2013

(30) Foreign Application Priority Data

Jun. 22, 2012   (EP) .................................... 12004711

(51) Int. Cl.
*F24J 2/14*   (2006.01)
*F24J 2/38*   (2014.01)
(Continued)

(52) U.S. Cl.
CPC .......... *F15B 11/028* (2013.01); *F15B 13/021* (2013.01); *F24J 2/14* (2013.01);
(Continued)

(58) Field of Classification Search
CPC ........ F15B 13/021; F15B 11/028; F16K 1/34; F16K 1/42; F16K 3/0236; F16K 25/005; F16K 25/02
(Continued)

(56) References Cited

U.S. PATENT DOCUMENTS 4,124,195 A  *  11/1978  Braun ....................... F16K 1/42
                                                           251/333
4,178,913 A     12/1979  Hutchison
(Continued)

FOREIGN PATENT DOCUMENTS

| DE | 102006040962 A1 | 3/2008 |
|----|-----------------|--------|
| DE | 102008050250 A1 | 4/2010 |
| EP | 1914458 A1 | 4/2008 |
| EP | 2226592 A1 | 9/2010 |
| EP | 2455685 A1 | 5/2012 |
| WO | 9629745 A1 | 9/1996 |
| WO | 2009087257 A1 | 7/2009 |

OTHER PUBLICATIONS

European Search Report Dated Nov. 6, 2012, Application No. 12004711.3-2301, Applicant HAWE Hydraulik SE, 6 Pages.

*Primary Examiner* — Kevin Murphy
*Assistant Examiner* — Kelsey Rohman
(74) *Attorney, Agent, or Firm* — Brooks Kushman P.C.

(57) ABSTRACT

In a solar generator, comprising a reflector and an electrohydraulic sun-position tracking device with at least one hydraulic cylinder and a hydraulic control seat valve, the reflector can be guided via the control seat valve to follow in synchronism with the course of the sun continuously and uninterruptedly. The control seat valve for regulating a pressure medium flow permanently supplied to the hydraulic cylinder comprises a seat surface and a sealing surface permanently pressed against each other with variable contact pressure, with which the pressure medium flow can be generated as controlled leakage. The sealing surface is made of a material that can be deformed by contact pressure. In the control seat valve, the controlled leakage is set in a control position at least substantially without lifting movement exclusively by the relative material deformation of the sealing surface on the seat surface, which deformation is set via the contact pressure.

14 Claims, 5 Drawing Sheets

(51) Int. Cl.
| | |
|---|---|
| *F24J 2/54* | (2006.01) |
| *F24J 2/10* | (2006.01) |
| *F15B 13/02* | (2006.01) |
| *F15B 11/028* | (2006.01) |
| *F16K 1/34* | (2006.01) |
| *F16K 1/42* | (2006.01) |
| *F16K 3/02* | (2006.01) |
| *F16K 25/00* | (2006.01) |
| *F16K 25/02* | (2006.01) |

(52) U.S. Cl.
CPC . *F24J 2/38* (2013.01); *F24J 2/54* (2013.01); *F24J 2/541* (2013.01); *F16K 1/34* (2013.01); *F16K 1/42* (2013.01); *F16K 3/0236* (2013.01); *F16K 25/005* (2013.01); *F16K 25/02* (2013.01); *F24J 2/10* (2013.01); *F24J 2002/5441* (2013.01); *Y02E 10/45* (2013.01); *Y02E 10/47* (2013.01); *Y10T 137/7848* (2015.04)

(58) Field of Classification Search
USPC .................................. 251/333, 334, 368, 359
See application file for complete search history.

(56) References Cited

U.S. PATENT DOCUMENTS

| | | | |
|---|---|---|---|
| 5,232,196 A | 8/1993 | Hutchings et al. | |
| 5,857,839 A * | 1/1999 | Fisher | F04B 27/1009 137/512.15 |
| 5,871,337 A * | 2/1999 | Fukanuma | F04B 39/1073 417/222.2 |
| 6,840,504 B2 * | 1/2005 | Hagiwara | F16K 1/36 251/129.15 |
| 2002/0063231 A1 * | 5/2002 | Fukui | A61B 5/0235 251/334 |
| 2008/0257430 A1 * | 10/2008 | Best | F16K 1/42 137/596.2 |
| 2008/0264363 A1 * | 10/2008 | Heusser | F15B 11/0445 123/90.12 |
| 2009/0267014 A1 * | 10/2009 | Ishitoya | F16J 15/104 251/359 |
| 2010/0300429 A1 * | 12/2010 | McNeil-Yeckel | F24J 2/541 126/604 |
| 2011/0001071 A1 * | 1/2011 | Neumair | F16K 31/0627 251/129.15 |
| 2011/0180736 A1 | 7/2011 | Mangiafico et al. | |

* cited by examiner

SOLAR GENERATOR AND HYDRAULIC CONTROL SEAT VALVE

CROSS-REFERENCE TO RELATED APPLICATIONS

This application claims foreign priority benefits under 35 U.S.C. §119(a)-(d) to European patent application number EP 12 004 711.3, filed Jun. 22, 2012, which is incorporated by reference in its entirety.

TECHNICAL FIELD

The present disclosure refers to a solar generator and to a hydraulic control seat valve.

BACKGROUND

In solar generators a mode of operation has established itself in which the tracking operation is carried out step by step, e.g., in that a control seat valve is controlled to open and close again after about 15 seconds for a few seconds or fractions of a second with a lifting movement of a valve component. The reason is that a sensitive continuous regulation of a very small volume flow, as would be required for continuous tracking, has so far not been possible at reasonable costs and over a long service life. In the case of a solar trough, which may definitely have a length of e.g., 200 m, as the reflector of the solar generator with an absorber pipe in the focal point area, the absorber pipe is manufactured with such a great diameter (and because of the high internal pressure with a great wall thickness) that despite the continuous movement of the sun during standstill of the reflector between two tracking steps it always remains within the focal point area and shows optimum performance. In a tracking step the absorber pipe is so to speak slightly advanced relative to the sun, and the sun travels during standstill of the absorber pipe just up to the end of the focal point area before a new tracking step is carried out. In comparison with the mechanical and hydraulic components of the solar generator the costs of the absorber pipe are a very dominating factor. Likewise in the case of stepwise tracking the hydraulic cylinders must be configured to be big and strong so as to be able to perform at least every tracking step precisely and fast enough, and they are therefore also relatively expensive.

Prior art: EP 2 455 685 A, EP 2 226 592 A, U.S. Pat. No. 4,178,913 A, WO 2009/087257 A, DE 10 2008 050 250 A, DE 10 2006 040 962 A.

SUMMARY

It is an object of the present disclosure to design a solar generator of the aforementioned type in a fail-safe manner and nevertheless at lower costs than in former times, and to create a control seat valve which on the one hand permits a synchronous continuous tracking of the reflector with a very small regulated volume flow and which, on the other hand, as an independent inventive idea is able to perform a sensitive regulation of a very small volume flow of e.g., less than 1.5 l/min for any desired hydraulic consumers.

Since in the solar generator the reflector is guided to follow in synchronism with the course of the sun and is thus guided at a slow pace, an optimum energy result is always ensured. It is only a very small volume flow that is here flowing. The regulation thereof takes place, as is customary in this technology, on the basis of the known sun-position and sun-course conditions, which are assigned to the geographic position of the solar generator, as a target setting, and e.g., monitored with detection of the actual position of the reflector. A commercial PLC can e.g., be used to operate the control seat valve electromagnetically, optionally with hydraulic pilot control, in which the control is programmed at the software side. In the tracking device the control seat valve with the control is inexpensive, has a very small size because of the small volume flow, and it is stable. The pressure medium for the tracking movement can be taken from a pressure accumulator without any problems, which saves power-intensive switch-on cycles of the pressure source, and lowers the switch-on frequency. The at least one hydraulic cylinder can be configured to be smaller and is moved for other setting movements of the reflector (return into the morning position, setting of a stowage position or maintenance position or storm position), optionally without the control seat valve in a different manner with greater volume flows. A considerable advantage results from the control seat valve in the case of a solar trough because the absorber pipe as a particularly expensive equipment piece above all in terms of the outer diameter (and the wall thickness) can be produced with a smaller size and thus at considerably lower costs because it is always placed in the focal point owing to the continuous tracking of the reflector.

According to an independent inventive aspect, however, the seat valve is an inexpensive hydraulic component also for other applications in the case of which a continuous and regulated, very small volume flow is needed, wherein the e.g., electrical control has to be implemented via a solenoid in a technically simple manner and thus at low costs. Even a mechanical and/or hydraulic operation of the control seat valve is possible so as to deform the sealing surface accordingly. The fact that the small volume flow is only regulated by mechanical deformation of the sealing surface on the seat surface without any lifting movement proper, and above all without any lifting stroke, minimizes the mechanical wear and ensures a long service life of the control seat valve. Particularly expediently, the control seat valve is operated by means of a proportional solenoid which, since it does not at least substantially have to perform a lifting movement at all, can be adapted in its operation behavior very precisely just to the task of a varying deformation of the sealing surface and thereby requires only little power.

The mechanical deformation of the sealing surface on the seat surface is not comparable with the deformation of an elastic seal of elastomer or rubber which is used in some seat valves for rather low operational pressures. The reason is that such an elastic seal shuts off completely in the case of a corresponding contact pressure, but opens upon relief or a lifting stroke suddenly, so that no sensitive regulation is possible.

In an expedient embodiment of the solar generator, the sealing surface in the control seat valve is acted upon by a proportional solenoid which comprises the armature and a pole piece in an insulation-containing armature tube. The armature acts on the sealing surface via an expediently non-magnetic plunger which extends through the pole piece, an actuation end of the armature being positioned in the area of the insulation and at the place where a maximum magnetic flux density occurs in the pole piece. This results in a high magnetic force with only a moderate or small power input because the proportional solenoid always works close to its maximum performance.

In the control seat valve the seat surface is expediently made of steel whereas the sealing surface is made of plastics, a nonferrous metal, a metal alloy, such as brass, light metal or a light-metal alloy, so that the seat surface on the sealing surface can be cold-formed. As the plastic material, PTFE or a glass fiber reinforced polyamide is e.g., used, for example with a commercial specification PA 66 GF30.

In an expedient embodiment the pole piece is contained in a screw-in sleeve which accommodates the closing body carrying the sealing surface, which is e.g., circular cylindrical and comprises the flat sealing surface machined on a cylinder end. The screw-in sleeve may have a stop for positioning a seat comprising the seat surface and a passage for the pressure medium, preferably of steel, the stop correspondingly positioning the seat in an accommodating bore containing channels connected to a pressure line and a working line, for the screw-in sleeve.

Furthermore, it is advantageous when a 2/2 directional seat valve with black/white solenoid operation is provided in parallel with the control seat valve between the pressure source, preferably a fixed displacement pump operable in the switch-off mode, and a pressure accumulator which can be filled via a pressure accumulator charging circuit, and a pressure line connected via directional control valves to operating lines of the hydraulic cylinder. The control seat valve only regulates the small volume flow for the continuous tracking of the reflector while the 2/2 directional seat valve is then in the shut-off position. By contrast, if other setting movements of the reflector are to be controlled that require a higher setting speed, the 2/2 directional seat valve is controlled to open in a corresponding manner, with the control seat valve remaining without a function.

In an expedient embodiment, the directional control valves are assigned to two 4/3 directional slide valves and two hydraulic cylinders that are connected in parallel, but are hinged in offset manner to a structure which rotates the reflector. It is the function of the directional slide valves to coordinate the respective movement directions of the hydraulic cylinders which have to travel offset to one another over dead point positions because of a great adjustment range of the reflector of e.g., more than 180°. For instance, the two hydraulic cylinders can be jointly extended or refracted, or one cylinder may be extended whereas the other one is retracted, and vice versa. Directional slide valves are inexpensive, but because of the slide principle they show minor leakage during operation. As a somewhat more expensive alternative, four 3/2 directional seat valves, each with solenoid operation, are therefore suited as directional control valves for two hydraulic cylinders; these are tight without leakage in the respective shut-off position so that the whole regulated volume flow from the control seat valve can then be used for tracking.

In an expedient embodiment of the control seat valve the sealing surface consists of a material, such as plastics, which can be mechanically deformed relative to the seat surface. PTFE is e.g., used as the plastic material, or a polyamide with a glass fiber blend, e.g., of the specification PA 66 GF340. However, nonferrous metals, metal alloys, light metals or light-metal alloys can also be used as the material; under mechanical contact pressure these show a predetermined deformation behavior just like a plastic material on at least substantially deformable seat surfaces.

The sealing surface is expediently provided on a closing body which consists at least predominantly of the deformable material. Preferably, said body may have a circular cylindrical form with flat end surfaces perpendicular to the cylinder axis. The axial length of the closing body should be chosen such that the deformation behavior of the sealing surface remains substantially linear over the force range used for deformation.

The sealing surface and the seat surface are expediently flat; according to an important aspect the seat surface has a predetermined roughness e.g., with fine grooves crossing the passage at least in part. The sealing surface which in the non-deformed state shows a predetermined flatness, it is e.g., machined, is deformable under the contact pressure into the grooves to control and regulate the leakage in the seat surface.

In an expedient embodiment the seat surface has a circular round contour, the passage as the bore in the center, and a predetermined surface area. The area of the sealing surface should here at least conform to the predetermined area of the seat surface. For instance, the predetermined area of the seat surface is about 10.5 mm$^2$ and the passage has a diameter of 1.0 mm. By contrast, the sealing surface has an area of about at least 11.3 mm$^2$.

The sealing surface is expediently made of glass fiber reinforced polyamide and is machined whereas the seat surface consists of steel, should be hardened and should have a predetermined roughness, e.g., with a roughness value between about Rz 1 to about Rz 5. These values may e.g., stand for grooves of a depth between about 1 µm and 5 µm.

After hardening the seat surface should be ground, preferably with a predetermined grinding tool grain, a predetermined grinding cycle number and a single grinding cycle direction. It may here be stipulated that only a contacting grinding cycle should first be carried out during grinding and that then the grinding tool is supplied to an exactly predetermined degree so as to carry out a further grinding cycle in the predetermined grinding cycle direction and to form substantially straight grooves.

Expediently, the seat surface in its surface size and roughness, the sealing surface in its deformation behavior, and the contact pressure in its variation range are matched to one another such that the volume flow from the controlled leakage within an inlet pressure range between about 100 to 300 bar can be regulated between 0.01 and 0.15 l/min, preferably even only between 0.05 to 0.1 l/min. In the case of a proportional solenoid for controlling the deformation of the sealing surface said solenoid may be designed such that it has a power consumption of only 21 watt in the case of maximum current application (dither frequency, e.g., 40 Hz).

Finally, it is important that the proportional solenoid is configured for deformation of the sealing surface such that it always operates at an optimum operation point near the maximum force. To this end the armature is actuated at least substantially without any lifting movement and is positioned with its actuation end in the armature tube such that the actuation end is positioned very close (0.5 to 0.7 mm) to the pole piece where a maximum magnetic flux density is present.

Embodiments of the subject matter of the disclosure shall be explained with reference to the below drawings.

DETAILED DESCRIPTION

Figure 1:
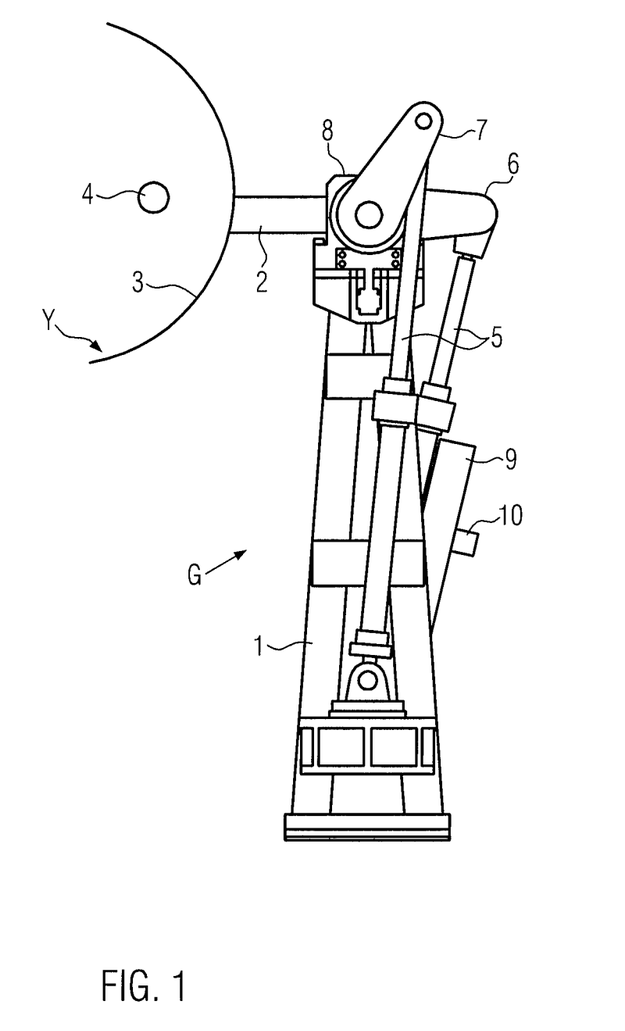
FIG. 1 is a schematic view of a solar generator.

FIG. 1 as a non-restrictive example shows a solar generator G with a continuously adjustable reflector Y following the position or course of the sun. In FIG. 1, the reflector Y is a so-called solar trough 3 in the focal point area of which an absorber pipe 4 is positioned. Alternatively, the reflector Y could also be a solar panel or a mirror, or the like (not shown)

The solar generator G comprises a pylon 1 on which an arm 2 which is carrying the reflector Y is rotatable about an axis 8, for example over at least 180°. In the pylon 1, two parallel-connected hydraulic cylinders 5 are supported that are coupled via arms 6 and 7 with the arm 2. Furthermore, a power pack 9 is provided, for instance on a hydraulic cylinder 5, which pack typically contains an electrohydraulic motor/pump unit with a fixed displacement pump operable in the switch-off mode, a pressure medium reservoir, or the like, and from which the hydraulic cylinders 5 are fed, wherein a controller 10 may be provided, e.g., a programmable logic controller PLC.

FIG. 1 shows the reflector Y e.g., in a morning position from which it is guided to follow in synchronism with the course of the sun during one day clockwise up into an evening position by actuation of the hydraulic cylinders 5. Continuous tracking is accomplished by feeding a very small regulated volume flow of e.g., 0.01 to 0.15 l/min at an operating pressure between about 100-300 bar. The respective position of the sun or the course of the sun is known for the geographic mounting position of the solar generator G and is taken into account in the regulation of the volume flow. The relative actual rotational angle of the arm 2 about the axis 8 can e.g., be sensed for keeping the position of the reflector Y always exactly in the sun position.

Figure 2:
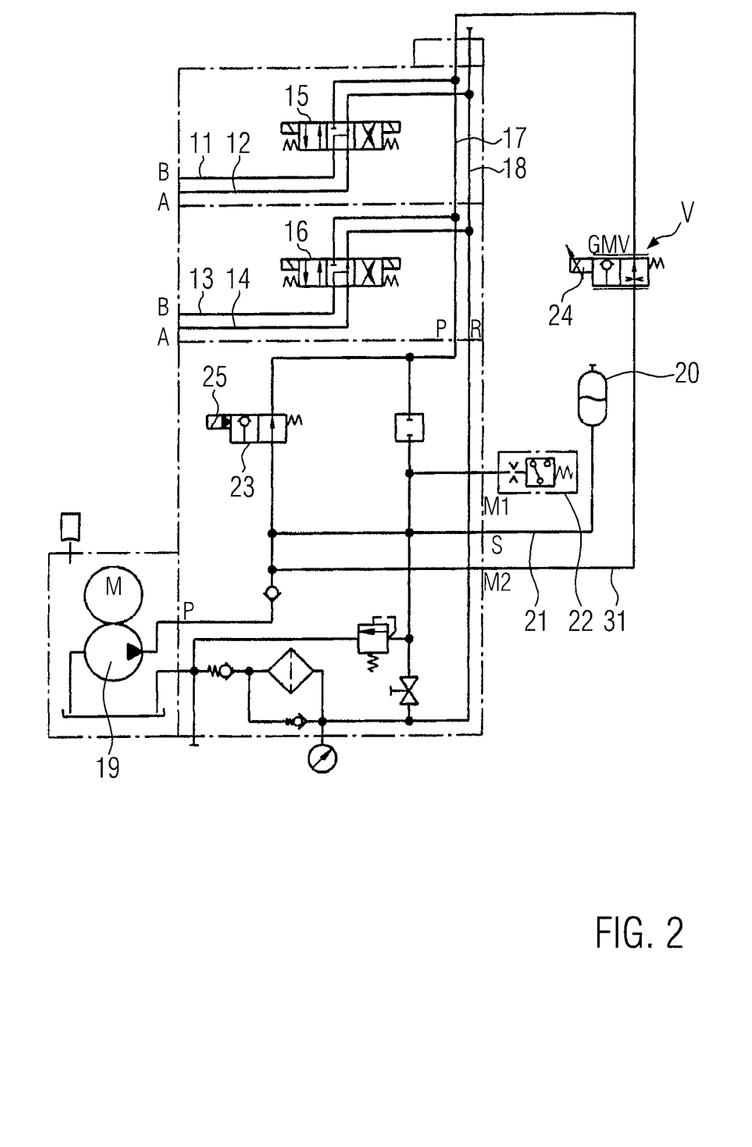
FIG. 2 is a block diagram of a first embodiment of an electrohydraulic sun-position tracking device of the reflector of the solar generator.

FIG. 2 as a block diagram shows main components of the sun-position tracking device, e.g., of the solar generator G of FIG. 1. In this embodiment, working lines 11, 12, 13, 14 are illustrated for the two hydraulic cylinders 5 which can be acted upon at both sides: these are connected to a pressure line 17 and a return line 18 via (in this embodiment) two 4/3 directional slide valves 15, 16 with solenoid operation. A pressure source 19 is e.g., a fixed displacement pump driven by an electric motor, which is operable in the switch-off mode, and a pressure accumulator 20 which is connected via a line 21 to the pressure line 17. The pressure line 17 has also connected thereto an electrical pressure switch 22 which is connected to the control and is e.g., used for a pressure accumulator charging operation. Furthermore, a line 31 branches off from the pressure line 17 and contains, according to the disclosure, a control seat valve V which is here e.g., operated by a proportional solenoid 24, with the line 31 leading to an end of the pressure line 17 while, starting from the pressure source 19, a 2/2 directional seat valve 23 with a black/white solenoid operation 25 is arranged in the pressure line 17 and, optionally, a hydraulic pressure pilot control. It is the function of the directional slide valves 15, 16 to correspondingly coordinate the movement directions of the hydraulic cylinders 5 which upon movement of the reflector Y during one day pass offset relative to each other through the dead point areas and have to be extended or retraced accordingly. By contrast, it is the function of the control seat valve V to track the reflector Y permanently and in synchronism with the course of the sun by feeding and regulating a very small volume flow into the hydraulic cylinders 5. It is the function of the 2/2 directional seat valve 23 to control other setting movements of the reflector. During continuous tracking the solenoid 25 is energized, so that the 2/2 directional seat valve is in the shut-off position and is tight without leakage preferably in both flow directions.

Figure 3:
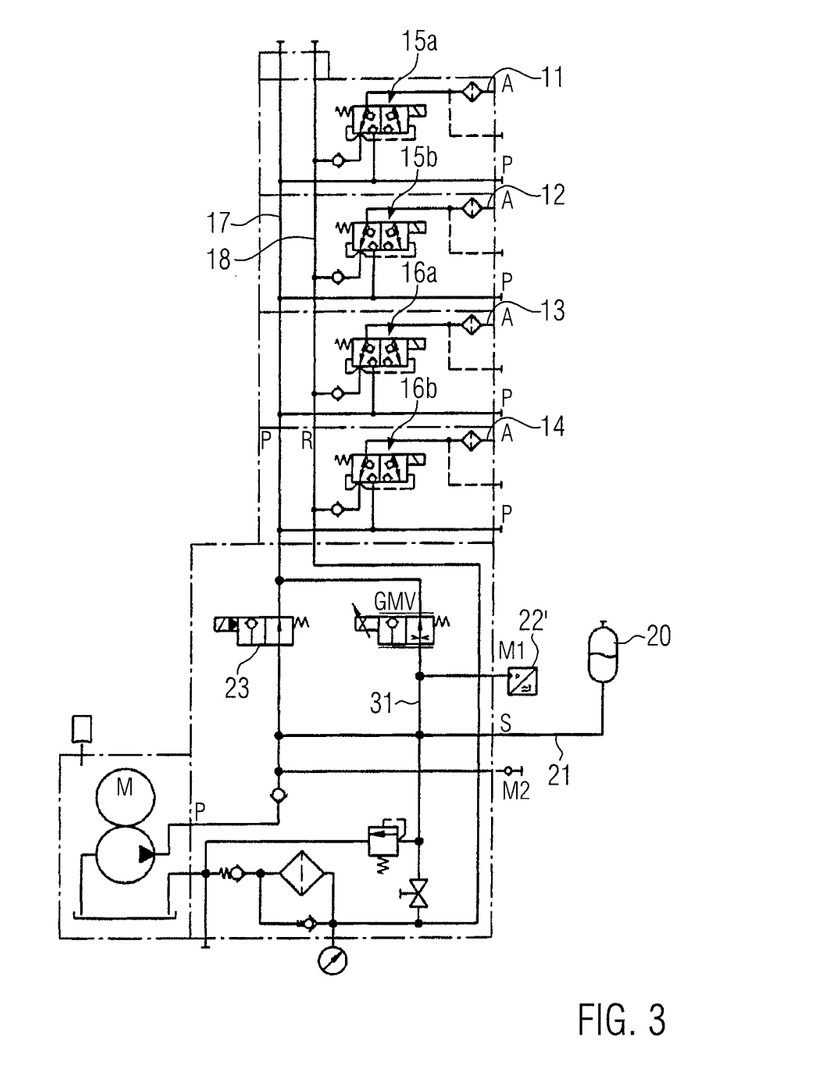
FIG. 3 is a block diagram of a further embodiment of a sun-position tracking device.

In the embodiment of the sun-position tracking device in FIG. 3 for example for the solar generator of FIG. 1, the directional control valves that are arranged between pressure line 17, return line 18 and the working lines 11, 12, 13, 14 of the hydraulic cylinders 5 are—in contrast to FIGS. 2—3/2 directional seat valves 15a, 15b, 16a, 16b, which are tight without leakage in the respective shut-off position. The further structure conforms to the one explained with reference to FIG. 2, except for the fact that instead of the pressure switch 22 of FIG. 2 a pressure sensor 22', e.g., for the pressure accumulator charging circuit, is provided.

Figure 4:
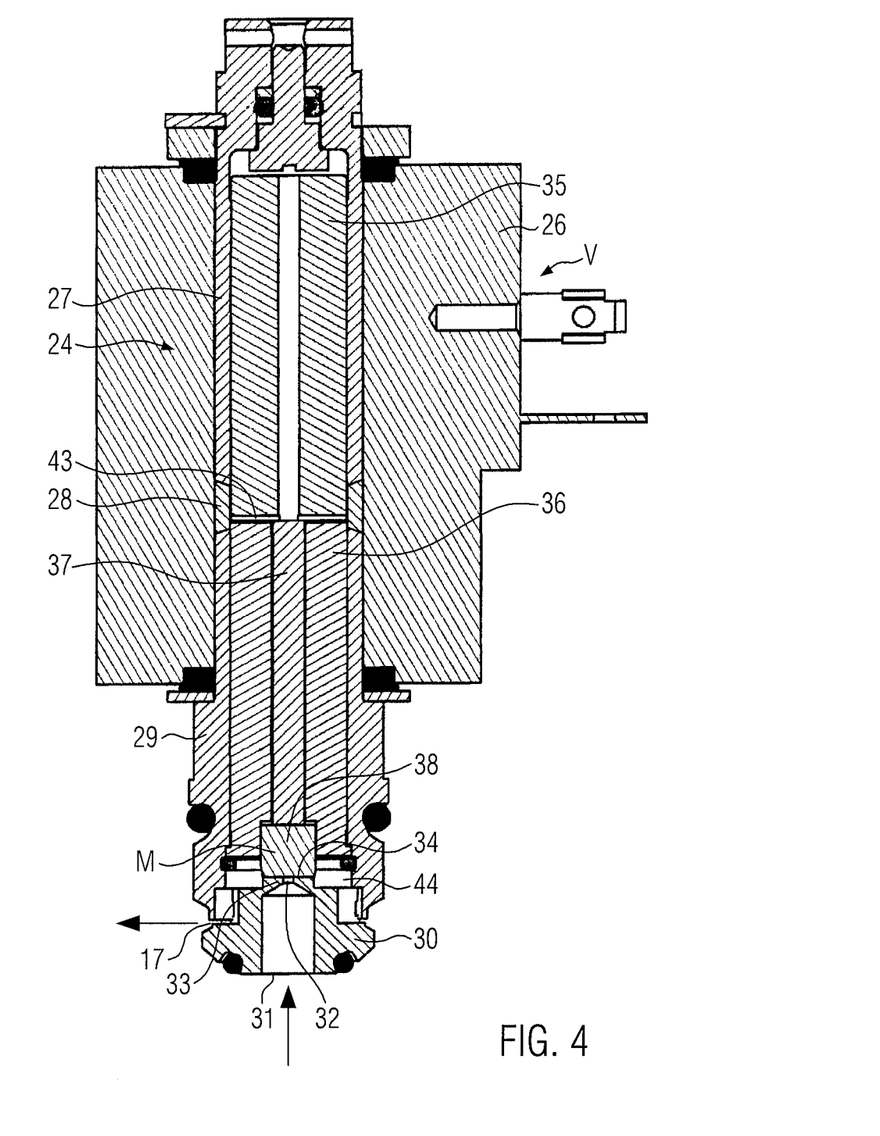
FIG. 4 is an axial section of a control seat valve for a sun-position tracking device and for other applications.

FIG. 4 illustrates the control seat valve V shown in FIGS. 2 and 3, which is compact and may e.g., have, together with the proportional solenoid 24, a diameter of about 40 mm at a length of about 90 mm.

The proportional solenoid 24 comprises a metal housing 26 (spool) which has arranged in a central bore an armature tube 27 which accommodates an armature 35 which is here e.g., longitudinally pierced. The armature tube is subdivided by a circumferential insulation 28 and is continued downwards into a screw-in sleeve 29 which projects beyond the lower end of the housing 26 and can be screwed into an accommodating bore 44 (only hinted at), in which channels (not outlined) are connected to the line 31 and the pressure line 17, respectively. The screw-in sleeve 29 is provided at the lower end with a stop for positioning a seat 30 of steel in the screw-in bore 44. At an extension at the top side the seat 30 comprises a flat, hardened and ground seat surface 33 in the center of which a passage 32 is formed as a bore. The seat surface 33 has a predetermined roughness, e.g., with a roughness value Rz 1 to Rz 5, which can be achieved in that a grinding tool with a predetermined grain is guided over the seat surface 33 in a predetermined number of passes and in a single predetermined direction of passage, e.g., in order to produce the predominantly straight grooves 39 which are shown on an enlarged scale in FIG. 5 and cross the passage 32 at least in portions.

The screw-in sleeve 29 has stationarily arranged therein a pole piece 36 the upper end of which is positioned in the area of the insulation 28. An actuation end 43 of the armature 35 is positioned such that it is located in the area of the insulation and is very close (e.g., 0.5-0.7 mm) to the upper end of the pole piece 36, i.e., in the area of the maximum magnetic flux density into the pole piece 36 and the housing 26. The pole piece 36 has arranged therein a plunger 37 which consists of non-magnetic material and the lower end of which acts on a closing body 38, here: a round circular body, of a material M which can be deformed under contact pressure by the armature 35. The closing body 38 is seated in the lower end of the pole piece 36 and is permanently pressed with a sealing surface 34 against the seat surface 33. Just like the seat surface 33, the sealing surface 34 is flat and circular and may be machined. The closing body 38 consists e.g., of plastics, such as PTFE or a polyamide with glass fiber reinforcement, and may have a length of about 4.0 mm at an outer diameter of about 3.8 mm. The passage 32 is e.g., a bore with an inner diameter of 1.0 mm, whereas the circular round outer contour of the seat surface 33 may have a diameter of 3.8 mm, so that the predetermined area of the seat surface 33 is about 10.5 mm2. With maximum energization the permanent magnet produces, e.g., with a power input of about 21 watt, a magnetic force between about 90 N and 100 N, with the magnet performing substantially no lifting movement, but it just varies the contact pressure force of the deformed sealing surface 34 on the seat surface 33 to regulate a small volume flow which is generated from a controlled leakage in the seat portion so as to control the continuous movement speed of the hydraulic cylinders 5 in conformity with the course of the sun. The input pressure in passage 32 is e.g., between about 100 to 300 bar, i.e., the volume flow is regulated within a pressure difference of e.g., about 200 bar.

Figure 5:
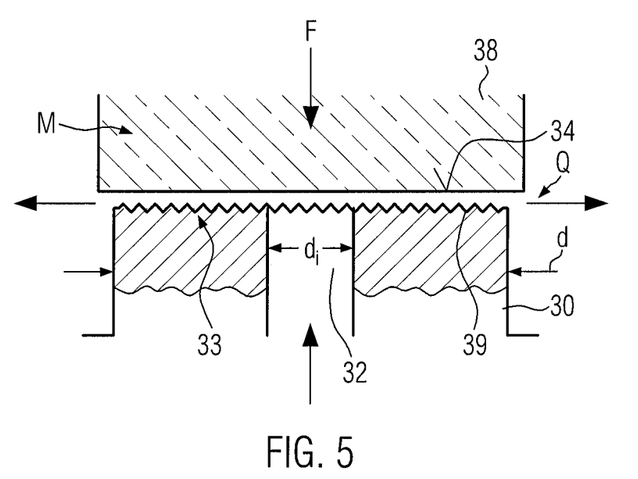
FIG. 5 is an enlarged schematic illustration of a detail of the control seat valve.

FIG. 5 illustrates that the area of the sealing surface 34 may be slightly larger than the predetermined area (d, di) of the seat surface 33 on the seat 30, the grooves 39 being illustrated on an exaggerated scale because they only have a roughness of e.g., 1-5 μm in actual fact. The closing body 38 is acted upon with the magnetic force F in the direction of the arrow, whereas the seat 30 is made stationary. Under the magnetic force F the sealing surface 34 is deformed into the grooves 39 to continuously regulate the leakage from passage 32 to the outside and thereby to generate the volume flow Q.

Figure 6:
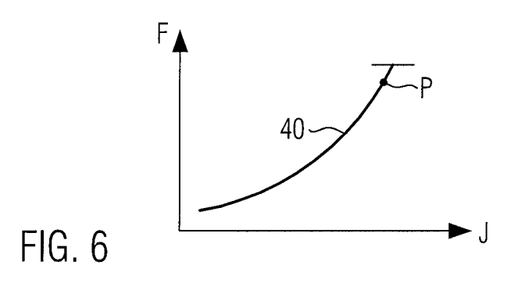
FIG. 6 is a diagram on the magnetic force against the solenoid current.

FIG. 6 illustrates the magnetic force F against the actuating current I of the permanent magnet 24 with a curve 40 which is shown at an optimum operation point P near the maximum of the magnetic force F. The permanent magnet 24 is configured such that it works at point P during operation of the control seat valve V.

Figure 7:
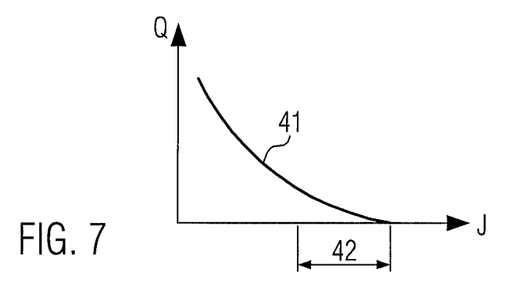
FIG. 7 is a diagram of the regulated volume flow against the solenoid current.

FIG. 7 illustrates the volume flow Q against the actuating current I with a curve 41 resembling a hyperbola, wherein an operation area 42, for instance for regulating the volume flow Q, is used, where an almost linear shape of the volume flow Q is present.

The control seat valve V is useable not only for the illustrated embodiments of the sun-position tracking devices of solar generators G, but also for other applications in which the continuous regulation of a very small volume flow is decisive.

Although it is possible that a complete shut-off takes place at maximum magnetic force F between the sealing surface 34 and the seat surface 33, the control seat valve V is operated during operation such that only a selected control range is used for regulating the volume flow Q in a sensitive way.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hydraulic control seat valve for the continuous speed control of a hydraulic cylinder, the control seat valve comprising:
    a seat surface made of at least substantially non-deformable material; and
    a sealing surface comprising a material that is deformable relative to the seat surface and configured to be permanently pressed against the seat surface in a seat portion of the control seat valve during use, the sealing surface or the seat surface surrounding a pressure medium passage;
    wherein the seat surface has a predetermined roughness with grooves that extend to or at least partially cross an open end of the pressure medium passage so that the grooves are able to intersect the pressure medium passage when the sealing surface is pressed against the seat surface, and the sealing surface has a predetermined flatness in a non-deformed state and is deformable by contact pressure into the grooves of the seat surface, and wherein the sealing surface and the seat surface are configured to be permanently pressed against one another by a set contact pressure without lifting movement in a hydraulic cylinder speed control position of the control seat valve for generating a continuous pressure medium flow from a pressure source to the hydraulic cylinder as a controlled regulated leakage through the seat portion by relative material deformation of the sealing surface on the seat surface, which deformation is set by the contact pressure of the sealing surface on the seat surface.

2. The control seat valve according to claim 1 wherein the deformable material comprises plastic, nonferrous metal, metal alloy, light metal, or light-metal alloy.

3. The control seat valve according to claim 1 wherein the sealing surface is provided on a closing body made at least predominantly of the deformable material.

4. The control seat valve according to claim 1 wherein the seat surface has a circular round contour, the passage as a bore in the center, and a predetermined area, and wherein the area of the sealing surface conforms at least to the predetermined area of the seat surface.

5. The control seat valve according to claim 1 wherein the sealing surface is made of a plastic material, and the seat surface is made of steel and has a roughness with the grooves defining a roughness value between about Rz 1 and Rz 5.

6. The control seat valve according to claim 5 wherein the plastic material comprises PTFE or glass fiber reinforced polyamide.

7. The control seat valve according to claim 5 wherein the sealing surface is machined and the seat surface is hardened and ground with a predetermined grinding tool grain that defines the grooves, in a predetermined number of grinding cycles and a single grinding cycle direction crossing at least in part the pressure medium passage.

8. The control seat valve according to claim 1 wherein the seat surface in a surface size and roughness defined by the grooves, the sealing surface in its deformation behavior, and the contact pressure in a predetermined variation range are matched to one another such that a pressure medium flow is controlled between 0.001 to 0.15 l/min in an inlet pressure range of the pressure source between about 100 to about 300 bar.

9. The control seat valve according to claim 1 further comprising a proportional solenoid for pressing the sealing surface with the contact pressure onto the seat surface, the proportional solenoid having an armature configured to be driven without lifting movement and being positioned with an actuation end in an area of a maximum magnetic flux density into a pole piece of the proportional solenoid.

10. The control seat valve according to claim 1 wherein the grooves are predominantly straight.

11. A hydraulic control seat valve for continuous speed control of a hydraulic cylinder of a solar generator, wherein the solar generator includes a reflector and an electrohydraulic sun-position tracking device for the reflector, the control seat valve is arrangeable between at least one working line of the hydraulic cylinder and a pressure source of the sun-position tracking device for guiding the reflector by speed control of the hydraulic cylinder with a pressure medium flow to the hydraulic cylinder to follow a course of the sun, the control seat valve comprising:

- a seat surface made of at least substantially non-deformable material; and
- a sealing surface comprising a material that is deformable relative to the seat surface under contact pressure and configured to be permanently pressed against the seat surface in a seat portion of the control seat valve during use, the sealing surface or the seat surface surrounding a pressure medium passage;
- wherein the seat surface has a pre-determined roughness with grooves that extend to or at least partially cross an open end of the pressure medium passage so that the grooves are able to intersect the pressure medium passage when the sealing surface is pressed against the seat surface, the sealing surface has a pre-determined flatness in a non-deformed state and is deformable by contact pressure into the grooves of the seat surface, and the sealing surface and the seat surface are configured to be permanently pressed against one another by the contact pressure without lifting movement in a hydraulic cylinder speed control position of the control seat valve for generating a continuous pressure medium flow from the pressure source to the hydraulic cylinder for guiding the reflector to follow the course of the sun in synchronism continuously and uninterruptedly as a controlled regulated leakage through the seat portion by relative material deformation of the sealing surface on the seat surface, the deformation being set by the contact pressure of the sealing surface on the seat surface.

12. The hydraulic control seat valve according to claim 11 further comprising a proportional solenoid for pressing the sealing surface with the contact pressure onto the seat surface without a lifting movement, the proportional solenoid comprising an armature accommodated in an insulation-containing armature tube and a pole piece, the proportional solenoid being operable to act on the sealing surface via a nonmagnetic plunger extending through the pole piece, with an actuation end of the armature being positioned in an area of the insulation of the armature tube and in an area of maximum magnetic flux density into the pole piece.

13. The hydraulic control seat valve according to claim 12 wherein the pole piece is seated in a screw-in sleeve comprising the sealing surface on a closing body and a stop for positioning a seat of steel comprising the seat surface and the pressure medium passage in an accommodating bore, including channels connected to a pressure line and a working line.

14. The hydraulic control seat valve according to claim 11 wherein the grooves are predominantly straight.

* * * * *

UNITED STATES PATENT AND TRADEMARK OFFICE
CERTIFICATE OF CORRECTION

PATENT NO. : 9,618,016 B2  
APPLICATION NO. : 13/920274  
DATED : April 11, 2017  
INVENTOR(S) : Martin Heusser et al.

It is certified that error appears in the above-identified patent and that said Letters Patent is hereby corrected as shown below:

In the Claims

Column 8, Line 9, Claim 1:
After "seat surface,"
Insert -- the grooves comprise at least two parallel grooves, --.

Column 8, Line 30, Claim 4:
After "circular round contour, the passage"
Delete "as" and
Insert -- has --.

Column 9, Lines 21-22, Claim 11:
After "seat surface,"
Insert -- the grooves comprise at least two parallel grooves, --.

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*